L. SHARPE.
Measuring Scale or Rule.

No. 222,744.   Patented Dec. 16, 1879.

WITNESSES.

INVENTOR.

Lucian Sharpe

UNITED STATES PATENT OFFICE.

LUCIAN SHARPE, OF PROVIDENCE, RHODE ISLAND, ASSIGNOR TO DARLING, BROWN & SHARPE, OF SAME PLACE.

IMPROVEMENT IN MEASURING SCALES OR RULES.

Specification forming part of Letters Patent No. 222,744, dated December 16, 1879; application filed September 30, 1878.

*To all whom it may concern:*

Be it known that I, LUCIAN SHARPE, of the city and county of Providence, and State of Rhode Island, have invented a new and useful Improvement in Measuring Scales or Rules; and I do hereby declare that the following specification, taken in connection with the accompanying drawings, forming a part of the same, is a full, clear, and exact description thereof.

This invention relates to graduated three-faced rules, commonly known as "draftsmen's scales."

Heretofore these rules or scales have usually been made of box-wood and of triangular section, as such shape furnishes the greatest number of edges for graduation that can be conveniently used. When first made these wooden scales are accurate; but, owing to the variations of temperature and moisture, they soon shrink and swell and become warped, and the angles of the scales, being brought to a fine edge that the graduations may come close to the paper, are easily broken and dented, so as to impair the value of the scale both for accuracy and convenient use.

The object, therefore, of my invention is to make a scale or rule of such material and in such a manner as to obviate the objectionable points of the wooden scale and preserve the valuable features of strength and lightness.

Figure 1:
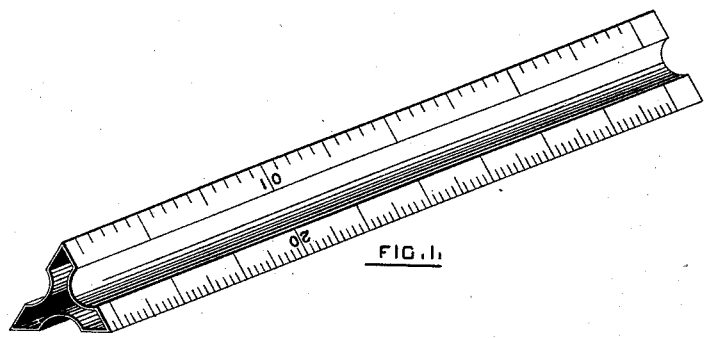
Figure 2:

Referring to the drawings, Figure 1 represents, in perspective, a portion of my improved scale, and Fig. 2 a transverse section of the same.

The material of which my improved scales are constructed is sheet-brass or other suitable metal, which is drawn into a seamless tube by any preferred means, and then converted into a triangular or other desired section by the use of a series of formers and soft-metal cores, or by any of the well-known methods used by workers in sheet metal.

For increased strength, convenience of use, and that distinct and independent planes or faces may be furnished for each specific graduation, the general triangular shape is broken by concavities extending longitudinally of the scale, as shown in both views of the drawings.

When thus brought into shape the scales may be cut to the required length, the ends closed, if desired, by thin pieces of metal soldered into place, and then graduated and finished, ready for use.

The advantages possessed by my improved scales are lightness, rigidity, freedom from shrinkage and curvature, and the material of which they are composed allows of the graduations being minute, clear, and sharp.

Although, as herein described, my improved scales are formed from drawn seamless tubes of sheet metal, yet I am aware that the same can be made of one or more pieces of thin metal, and the edges be soldered together, so as to make the rule practically seamless, without substantially altering the character of the article.

I do not broadly claim to have invented a graduated tubular structure of metal, for I am well aware that the United States Patent of Van Der Veer, dated April 30, A. D. 1850, shows and describes a log-rule, the outer metal shell of which is arranged so that a cylindrical table of measurements may be moved longitudinally therein, and said metal shell is slotted and graduated, whereby with the proper coincidence of the exterior graduations with those upon the interior table the contents of a log or board may be determined; but said device is wholly impracticable for use as a draftsman's rule or scale; nor do I broadly claim to have invented a hollow triangular sheet-metal rule, but limit my invention to such a rule having longitudinal concaved recesses, as shown and described, because metal rules should be made of as thin metal as possible, so as to avoid undue weight therein, and, by reason of the longitudinal concavities, the sheet-metal rule is strengthened and stiffened, and rendered less liable to accidental breaking or warping and springing. It will be seen that said concavities possess in a sheet-metal rule functions, in this respect of strengthening, which are the exact opposite of the same concavities in a wooden rule, in which they are an element of weakness, and render the wooden rule more easily broken, sprung, or warped than if said concavities were not employed.

Having described my invention, what I claim, and desire to secure by Letters Patent as a new manufacture, is—

The improved draftsman's rule, substantially as hereinbefore set forth, the same being a three-faced hollow seamless sheet-metal rule or scale, triangular in cross-section and longitudinally concaved, as and for the purposes specified.

LUCIAN SHARPE.

Witnesses:
GEO. FULLER,
J. C. B. WOODS.